(12) United States Patent
Van Elburg et al.

(10) Patent No.: US 8,260,957 B2
(45) Date of Patent: Sep. 4, 2012

(54) GROUP ACCESS TO IP MULTIMEDIA SUBSYSTEM SERVICE

(75) Inventors: Hans-Erik Van Elburg, Oosterhout (NL); Fredrik Lindholm, Älvsjö (SE); Patrick Timmers, Utrecht (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/528,397

(22) PCT Filed: Feb. 12, 2008

(86) PCT No.: PCT/EP2008/051676
§ 371 (c)(1),
(2), (4) Date: Sep. 23, 2011

(87) PCT Pub. No.: WO2008/101838
PCT Pub. Date: Aug. 28, 2008

(65) Prior Publication Data
US 2012/0011273 A1    Jan. 12, 2012

(30) Foreign Application Priority Data

Feb. 22, 2007 (WO) ................. PCT/EP2007/051720
Oct. 1, 2007 (WO) ................. PCT/EP2007/060399

(51) Int. Cl.
*G06F 15/173* (2006.01)
(52) U.S. Cl. ......... 709/238; 709/217; 709/206; 370/328
(58) Field of Classification Search .................... 709/238
See application file for complete search history.

(56) References Cited

U.S. PATENT DOCUMENTS

2005/0053072 A1*   3/2005   Guerrero et al. ......... 370/395.32
2008/0240016 A1*  10/2008   Cai et al. ....................... 370/328

FOREIGN PATENT DOCUMENTS

WO   WO 2006/120303        11/2006
WO   WO 2006/120303 A      11/2006

OTHER PUBLICATIONS

Kim Lynggaaro Larsen et al: "Corporate Convergence with the 3GPP IP Multimedia Subsystem" Next Generation Mobile Applications, Services and Technologies, 2007. NGMAST '07. The 2007 International Conference on, IEEE, PI, Sep. 1, 2007, pp. 29-35, XP031142476.

(Continued)

*Primary Examiner* — Hua Fan

(57) ABSTRACT

A method of facilitating access to services of an IP Multimedia Subsystem, by users groups that require alternative handling in relation to the standard handling of IP Multimedia Subsystem users. Functioning instructions are added to the user groups subscription maintained in the IP Multimedia Subsystem, instructing nodes in the IP Multimedia Subsystem to adapt their standard functioning for this specific group of users. The instructions in a subscription of a specific user group, provide a node of the IP Multimedia Subsystem that does no longer need to be specific for certain types of users, but has a standard way of operation, that is modified by instructions for dedicated operation for only that specific user group. In further aspect embodiments are disclosed providing improved solutions for known problems of IP Multimedia Subsystems making use of functioning instructions included in the subscription.

12 Claims, 11 Drawing Sheets

OTHER PUBLICATIONS

Sibley C et al: "IP PBX / Service Provider Interoperability sf-draft-twg-IP_PBX_SP_Interop-sibley-s i p connect" Internet Citation, URL:www.sipforum.org/component/option.com_docman/task,doc_download/gid,83 /Itemid,75/> [retrieved on Feb. 16, 2007].

Kim Lynggaard Larsen et al. "Corprorate Convergence with the 3GPP IP Multimedia Subsystem" Mext Generation Mobile Applications, Services and Technologies, 2007. NGMAST '07.The 2007 International Conference on, IEEE, PI, Sep. 1, 2007, pp. 29-35.

Sibley C et al. "IP PBX/Service Provider Interoperability sf-draft-twg-IP_PBX_SP_Interop-sibley-sipconnect".

3GPP. 3$^{rd}$ Generation Partnership Project: Technical Specification Group Services and System Aspects; Service requirements for the Internet Protocol (IP) multimedia core network subsystem; Stage 1 (Release 8). 3GPP TS 22.228 V8.1.0 (Sep. 2006).

3GPP. 3$^{rd}$ Generation Partnership Project; Technical Specification Group Services and System Aspects; IP Multimedia Subsystem (IMS); Stage 2 (Release 7). 3GPP TS 23.228 v7.5.0 (Sep. 2006).

3GPP. 3$^{rd}$ Generation Partnership Project; Technical Specification Group Services and System Aspects; 3G Security; Access Security for IP-Based Services. (Release 7). 3GPP TS 33.203 v7.4.0 (Dec. 2006).

Rosenberg, J. et al. SIP: Session Initiation Protocol. Network Working Group. Request for Comments: 3261, Jun. 2002.

Berners-Lee, T. et al. Uniform Resource Identifiers (URI): Generic Syntax. Network Working Group. Request for Comments: 2396, Aug. 1998.

Schulzrinne, H. The Tel URI for Telephone Numbers, Network Working Group. Request for Comments: 3966, Dec. 2004.

Arkko, J. et al. Security Mechanism Agreement for the Session Initiation Protocol (SIP). Network Working Group Request for Comments: 3329, Jan. 2003.

* cited by examiner

GROUP ACCESS TO IP MULTIMEDIA SUBSYSTEM SERVICE

TECHNICAL FIELD

The present invention relates to group access to IP Multimedia Subsystem services and in particular to facilitating such access to users that do not have individual IP Multimedia Subsystem subscriptions but belong to a group that does.

BACKGROUND

IP Multimedia Subsystem (IMS) is the technology defined by the Third Generation Partnership Project (3GPP) to provide IP Multimedia services over mobile communication networks (3GPP TS 22.228). IMS provides key features to enrich the end-user person-to-person communication experience through the integration and interaction of services. IMS allows new rich person-to-person (client-to-client) as well as person-to-content (client-to-server) communications over an IP-based network.

The IMS makes use of the Session Initiation Protocol (SIP) to set up and control calls or sessions between user terminals (UEs) or between UEs and application servers (ASs). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Both SIP and SDP are carried by standard UDP and TCP internet protocols. SIP or SDP messages below 1300 bytes will be transported via UDP; else TCP is used to transport them.

Within an IMS network, Call/Session Control Functions (CSCFs) operate as SIP entities within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

IMS service functionality is implemented using application servers (ASs). For any given UE, one or more ASs may be associated with that terminal. ASs communicate with an S-CSCF via the IMS Service Control (ISC) interface and are linked into a SIP messaging route as required (e.g. as a result of the triggering of IFCs downloaded into the S-CSCF for a given UE).

A user registers in the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user using subscription information stored in a Home Subscriber Server (HSS), and allocates a S-CSCF to that user from the set of available S-CSCFs. Whilst the criteria for allocating S-CSCFs are not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions which would otherwise bypass the S-CSCF.

During the registration process, it is the responsibility of the I-CSCF to select an S-CSCF, if an S-CSCF is not already selected. The I-CSCF receives the required S-CSCF capabilities from the HSS, and selects an appropriate S-CSCF based on the received capabilities. It is noted that S-CSCF allocation is also carried out for a user by the I-CSCF in the case where the user is called by another party, and the user is not currently allocated an S-CSCF. When a registered user subsequently sends a session request to the IMS, the P-CSCF is able to forward the request to the selected S-CSCF based on information received from the S-CSCF during the registration process.

Every IMS user possesses one or more Private User Identities. A Private User Identity is assigned by the home network operator and is used by the IMS, for example for registration, authorisation, administration, and accounting purposes. This identity takes the form of a Network Access Identifier (NAI) as defined in IETF RFC 2486. It is possible for a representation of the International Mobile Subscriber Identity (IMSI) to be contained within the NAI for the private identity. 3GPP TS 23.228 specifies the following properties of the Private User Identity:

- The Private User Identity is not used for routing of SIP messages.
- The Private User Identity shall be contained in all Registration requests, (including Re-registration and De-registration requests) passed from the UE to the home network.
- An IP multimedia Services Identity Module (ISIM) application shall securely store one Private User Identity. It shall not be possible for the UE to modify the Private User Identity information stored on the ISIM application.
- The Private User Identity is a unique global identity defined by the Home Network Operator, which may be used within the home network to identify the user's subscription (e.g. IM service capability) from a network perspective. The Private User Identity identifies the subscription, not the user.
- The Private User Identity shall be permanently allocated to a user's subscription (it is not a dynamic identity), and is valid for the duration of the user's subscription with the home network.
- The Private User Identity is used to identify the user's information (for example authentication information) stored within the HSS (for use for example during Registration).
- The Private User Identity may be present in charging records based on operator policies.
- The Private User Identity is authenticated only during registration of the user, (including re-registration and de-registration).
- The HSS needs to store the Private User Identity.
- The S-CSCF needs to obtain and store the Private User Identity upon registration and unregistered termination.

In addition to a Private User Identity, every IMS user shall have one or more IMS Public User Identities (PUIs). The PUIs are used by any user to request communications to other users. A user might for example include a PUI (but not a Private User Identity) on a business card. 3GPP TS 23.228 specifies the following properties of the PUI:

- Both telecom numbering and Internet naming schemes can be used to address users depending on the PUIs that the users have.
- The PUI(s) shall take the form of a SIP URI (as defined in RFC 3261 and RFC 2396 or the "tel:"-URI format defined in RFC 3966.
- An ISIM application shall securely store at least one PUI (it shall not be possible for the UE to modify the PUI), but it is not required that all additional PUIs be stored on the ISIM application.

A PUI shall be registered either explicitly or implicitly before the identity can be used to originate IMS sessions and IMS session unrelated procedures.

A PUI shall be registered either explicitly or implicitly before terminating IMS sessions and terminating IMS session unrelated procedures can be delivered to the UE of the user that the PUI belongs to.

It shall be possible to register globally (i.e. through one single UE request) a user that has more than one PUI via a mechanism within the IMS (e.g. by using an Implicit Registration Set). This shall not preclude the user from registering individually some of his/her PUIs if needed.

PUIs are not authenticated by the network during registration.

PUIs may be used to identify the user's information within the HSS (for example during mobile terminated session set-up).

PUIs may be used by ASs within the IMS to identify service configuration data to be applied to a user.

An IMS user has one or more IMS subscriptions. The IMS subscription has one Private User Identity and at least one Service Profile. The Service Profile contains at least one Public User identity. A Public User Identity can only be associated to one Service Profile where the Private User Identity can be associated with more than one Service profile. FIG. 1 illustrates schematically example relationships between a user of the IMS, his IMS subscriptions and the Public and Private User Identities. In the example shown, a subscriber has two Private User Identities each associated with one IMS subscription, with both being associated with two Public User Identities (one of the Public User Identities, Public User Identities-2, being associated with both Private User Identities). A Service Profile is associated with each Public User Identity, this profile specifying service data for the associated Public User Identities. A Service Profile is created or modified when an application server is provisioned for a user at the Home Subscriber Server (HSS). Each Service Profile comprises one or more initial Filter Criteria (iFC) which are used to trigger the provision, or restriction, of IMS services. The differences between services offered by Service Profile-1 and Service Profile-2 are operator specific, but may involve different application servers (ASs), and even different charging/rating schemes.

In the example, Public User Identity-1 is associated with a Service Profile-1, whilst Public User Identity-2 and Public User Identity-3 are associated with Service Profile-2. In a typical scenario, the Public User Identity-1 might be an identity that the user gives to friends and family, e.g. "Big_Joe@priv.operator.com", whilst Public User Identity-2 and Public User Identity-3 might be identities that the user gives to business contacts, e.g. "+46111222333@operator.com" and "joe.black@operator.com".

3GPP defines a so-called "Implicit Registration Set" concept to identify a set of PUIs that work as a group, and which are registered and deregistered together when any one of the PUIs of the set is registered or deregistered. Upon registration of an IMS user's terminal or upon receiving a connection request for the user's terminal when not yet registered, the S-CSCF, after triggering by an I-CSCF, requests the subscription details (also denoted as user profile) from the HSS, identified by the Private and Public User Identity received in the trigger from the I-CSCF. As described above the subscription (user profile) contains one or more Service Profiles and each Service Profile contains one or more Public User Identities. See for example User Profile 1 in FIG. 1. All the Public User Identities in the User profile together are denoted the Implicit Registration Set.

For purpose of understanding a more detailed description of the standard registration procedure is given hereafter with reference to FIG. 2. Before a UE can set-up a session or incorporate IMS services it needs to register in the IMS. In the following example Joe Black registers under his Public Identity "Big_Joe@operator1.com" in the IMS of Operator 1 where he has an IMS subscription. FIG. 1 gives an overview of the messages. The actual registration process consists of 2 phases. In the first phase a not secured register is send to the S-CSCF. The S-CSCF authenticates the UE/PUI in a first step and sends back a challenge to the UE with a SIP 401 message. The UE uses the challenge to calculate a response that is sent in a subsequent REGISTER message for phase 2 of the registration. Besides calculating the response this intermediate between the two phases is also used by the UE to negotiate a secure IP channel (IP-Sec) with the P-CSCF. When the S-CSCF receives the second register it completes the authorisation and registers the UE/PUI. When registration is completed a SIP 200 message is send back to the UE. After completing the registration the S-CSCF further registers the PUI at all relevant IMS applications as indicated by the iFC's in the user profile obtained from the HSS.

Before the UE can assemble the REGISTER message it needs to acquire the IP address of the P-CSCF. This address can be stored in the UE but more likely only an alias of the P-CSCF is stored and the UE requires getting the correct IP address via DHCP and/or DNS. The UE then assembles the REGISTER message and sends it towards the P-CSCF. The message (1 of FIG. 2) is given below in simplified form. Only fields relevant for the explanation of the current invention are discussed.

```
**************************************************************
REGISTER sip: operator1.com
Via: <current IP of Joe Blacks UE>; branch=0uetb
Route: <current IP address of P-CSCF>
Max-Forwards: 50
From: Big_Joe@operator1.com
To: Big_Joe@operator1.com
Contact: <current IP of Joe Blacks UE>; expires=2000
Call-ID: grt38u6yqr54gfkp98y6t3rr
CSeq: 25 REGISTER
Content-Length: 0
**************************************************************
```

The type of message is REGISTER. Cseq and Call-ID give a unique identification of this register transaction. The message is basically only a message header without payload (like voice or video packages) hence Content-Length is set to 0. The initial destination is given by "SIP: operator1.com" as that is where the UE wants to register. The From field gives the Public User Identity of Joe Black which he wants to use. The To field is identical, as that is for which prime registration is requested. The Contact field contains the current IP address of the UE, expires indicates the remaining lease period when the IP address is leased for a definite period of time. It indicates how long the SIP URI in the To field is bound to the IP address in the Contact field.

The Route field contains each time the next SIP entity the message is sent to. Each SIP entity the message past through will add it self in a Via header as to create so a return path. The Max-Forwards is lowered by one after passing each SIP entity to prevent that the message starts bouncing in the IP network. When the value becomes 0 the message is deleted.

When the message arrives at the P-CSCF, the P-CSCF removes its own address from the route header and puts it in a Via header. Then the P-CSCF starts investigation on which I-CSCF to forward the message to. This I-CSCF can be in another network of another operator. It therefore uses the requested URI in the REGISTER field and DNS to resolve the domain name and subsequent DNS, NAPTR, SRV and AAAA queries to obtain an I-CSCF address. The P-CSCF can however not be sure that the I-CSCF will perform the SIP entity function or just act as a router to just another I-CSCF. It there fore does not put the address in the route field but in the destination field of an underlying UDP message that transports the SIP register message. Additionally the P-CSCF includes a Path field with its own identity. The S-CSCF can use the Path field as the exact location to send any future responses to the UE as the UE it self is shielded, the P-CSCF is the entrance of a secure IP tunnel to the UE. The message 2 send now looks like;

```
****************************************************************
REGISTER sip: operator1.com
Via: <current IP address of P-CSCF>; branch=0pctb
Via: <current IP of Joe Blacks UE>; branch=0uetb
Route:
Path: current IP address of P-CSCF>
Max-Forwards: 49
From: Big_Joe@operator1.com
To: Big_Joe@operator1.com
Contact: <current IP of Joe Blacks UE>; expires=2000
Call-ID: grt38u6yqr54gfkp98y6t3rr
CSeq: 25 REGISTER
Content-Length: 0
****************************************************************
```

When received, the I-CSCF puts its address in a Via header. Then it requires obtaining the address of the S-CSCF. It therefore does a Location Information Request 3 to the HSS. The HSS responds with a Location Information Answer 4. It then uses the obtained S-CSCF address or determines a S-CSCF address and puts in the Route field. Message 5 looks now like;

```
****************************************************************
REGISTER sip: operator1.com
Via: <current IP address of S-CSCF>; branch=0ictb
Via: <current IP address of P-CSCF>; branch=0pctb
Via: <current IP of Joe Blacks UE>; branch=0uetb
Route: < current IP address of S-CSCF>
Max-Forwards: 48
From: Big_Joe@operator1.com
To: Big_Joe@operator1.com
Contact: <current IP of Joe Blacks UE>; expires=2000
Call-ID: grt38u6yqr54gfkp98y6t3rr
CSeq: 25 REGISTER
Content-Length: 0
****************************************************************
```

Now the S-CSCF has received the message it starts first with verifying whether the requested registration is possible, PUI is known. It therefore does a Location Information Request 6 to the HSS. The HSS responds with a Location Information Answer 7. The PUI is known but registration is denied as full authentication has not yet been performed. Therefore the S-CSCF sends a 401 unauthorised message back to the UE. This message contains the WWW-authenticate field that contains the challenge keys. Full details of the authentication and security aspects can be found in 3GPP TS 33.203 and RFC 3329.

The message follows the same route back to the UE via messages 8, 9 and 10. The route back is indicated by the Via fields assembled during the transport to the S-CSCF. Each SIP entity removes the first Via header (being it self) and routes to the next Via header. In addition the I-CSCF includes a Service-Route field. The UE can use this for all other message then the REGISTER message so the P-CSCF is released from performing the tedious task of allocating the correct I-CSCF each time.

The UE receiving the 401 not authorised message now continues with the negotiation of a secure IP tunnel with the P-CSCF. It then calculates a response for the P-CSCF and one for the S-SCSF. The first one being for establishing the secure connection to the P-CSCF the second one for the S-CSCF to complete the authorisation and perform the registration. The responses of the UE are contained in the authorisation field of a second REGISTER message. The following flow of messages 11, 12, 13, 14, and 15 is identical to the previous REGISTER messages flow 1, 2, 3, 4, and 5.

The S-CSCF now checks if the challenge response is correct and then continues with a Location Information Request 16 to the HSS. The HSS responds with a Location Information Answer 17. The answer contains the User Profile as determined by the HSS on basis of the Private User Identity and Public User Identity as given in the request by the S-CSCF. The User Profile provides the S-CSCF the Implicit registration set of all Public User Identities that associated with the Private user identity including the Service Profiles associated with the PUI's. These PUI's are so implicitly registered with the PUI in the REGISTER message. The IP address of the UE is bound to the PUI's for a period no longer then what is expressed in the expire field of the REGISTER message. This period can be less depending on the operator policies for maximum registration period.

First step now is that the S-CSCF sends a 200 OK message to the UE in the same way as the 401 not authorised message. This message flow is indicated by messages 18, 19 and 20.

As second step the S-CSCF uses the iFC fields in the Service Profiles contained in the User Profile to register the PUI of the REGISTER message with the IMS applications as indicated in the iFC fields. Note that the application is only informed of the one PUI in the REGISTER messages 21 to the applications. For obtaining information on the other PUI implicitly registered they need to subscribe to registration-state (change) information at the S-CSCF. Like wise the UE needs to subscribe directly after getting the 200 OK message to get information on the registration state of other implicitly registered PUI's.

The above described registration is kept to the mere basics required to understand the merits of the current invention. For a more detailed description reference is made to state of the art manuals as "The IMS" ISBN 978-0-470-01906-1.

In the case of Joe Black described before, one user had one subscription with multiple PUI's. Another possible use case of the IMS involves a collection of users having a group level subscription to the IMS, but where the individual users themselves have no subscription. In general the group is shielded by means of an access point that takes care of handling SIP sessions towards the IMS on behalf of the group.

Instead of the group the access point registers in the IMS, comparable to a UE. Nonetheless, it is desirable or even necessary to allow direct inward and outward dialing to those users. This might arise, for example, in the case of an enterprise having a subscription to the IMS and having individual employee stations or terminals attached to an IP private branch exchange (IP-PBX). The employee terminals may or may not be provided with SIP clients. In the latter case, the IP-PBX performs a translation between SIP and non-SIP signalling. Whilst it might of course be possible for the IMS to record an individual PUI for each terminal (within the same Implicit Registration Set), this becomes inefficient as the group size becomes large. ETSI TISPAN defines such a corporate network as a Next Generation Corporate Network (NGCN).

An alternative solution is illustrated schematically in FIGS. 3 and 4 which shows an IP-PBX (designated "IP-PBX1" and "IP-PBX 2") as access point which serves a plurality of user terminals. One calling terminal is shown as extension 1234 and one is shown as "Ext. 5678". The first terminal is requesting a session to the second one. User at enterprise 1 and 2 have a dedicated Business Trunk application (BT-AS) in the IMS. This application requires having the identity of the calling/originating or called/terminating party to provide certain services. This solution employs the so-called Public Service Identity (PSI) which identifies publicly available network-based IMS services for users. The solution defines within the HSS, in a Service Profile of the subscription for the IP-PBX, a wild carded PSI, which matches the PUIs specified for the terminals belonging to an IP-PBX, giving access to certain applications in the IMS. The solution provides workarounds for calling and called cases using a PSI in conjunction with the BT-AS for the purpose of user to user sessions. The registration of IP-PBX1 and 2 is identical to that of a regular UE in that the IP-PBX registers with his own PUI.

FIG. 3 illustrates a workaround solution for the originating (calling) case, i.e. where a terminal behind a PBX initiates a call to a remote terminal. The IP-PBX1 belongs to enterprise1) and has as own PUI "PBX1@operator1.com". IP-PBX1 has as group code 850 and as number range +31 161 24 xxxx. An employee Alice requests to set up a session from her terminal with extension 1234 to Bob at enterprise 2 having extension 5678 behind a IP-PBX 2 with group code 851 as defined by IP-PBX1.

The request 101 of Alice is received at IP-PBX1 that assembles the outgoing request 102 towards the P-CSCF. The format of the message looks like;

```
****************************************************************
INVITE Tel: +31161255678
From: Alice <Tel: 8501234>
To: Bob <Tel: 8515678; phone-context=enterprise1.com>
P-Preferred-Identity: Tel: +31161241234
****************************************************************
```

When received the outbound P-CSCF does not recognise the P-Preferred. Identity contained within the INVITE. It uses as a default P-Asserted-Identity the PUI of IP-PBX1, namely "pbx1@operator1.com". The message 103 now send by the P-CSCF to the S-CSCF looks like;

```
****************************************************************
INVITE Tel: +31161255678
From: Alice <Tel: 8501234>
To: Bob <Tel: 8515678; phone-context=enterprise1.com>
P-Asserted-Identity: pbx1@operator1.com
****************************************************************
```

At the S-CSCF, it uses the P-Asserted-Identity of the message to check the user profile of IP-PBX1 and finds a service profile with an IFC telling the S-CSCF to involve the BT application. The S-CSCF therefore sends 104 the INVITE message as received to the BT application. The BT application server validates and asserts that the originating user is the user that is identified in the "From" header, and replaces the P-Asserted-Identity header with the identity of the calling user, namely "tel:+31161241234". The BT application returns the INVITE message 105 modified with a new asserted ID for Alice. The message now looks like;

```
****************************************************************
INVITE Tel: +31161255678
From: Alice <Tel: 8501234>
To: Bob <Tel: 8515678; phone-context=enterprise1.com>
P-Asserted-Identity: Tel: +31161241234
****************************************************************
```

Back at the S-CSCF it has to perform an ENUM lookup 106 to translate the requested Tel URI into a known SIP URI. The adapted INVITE message 107 is then send to the Interconnected Border Control Function, (I-BCF) of operator 1 for further transport to the network of operator 2. The finally INVITE message looks like;

```
****************************************************************
INVITE SIP: +31161255678@operator2.com;user=phone
From: Alice <Tel: 8501234>
To: Bob <Tel: 8515678; phone-context=enterprise1.com>
P-Asserted-Identity: Tel: +31161241234
****************************************************************
```

Further referring to FIG. 4 the INVITE message arrives at the I-BCF of operator 2. It will forward the message as received 201 to an I-CSCF. The I-CSCF will recognise a SIP request URI corresponding to a telephone number and will convert this to a Tel URI. In this example of Alice to Bob connection, the SIP request URI is "sip:+31161255678@operator2.com, user=phone", and this is converted to the Tel URI "Tel: +31161255678". The I-CSCF then sends a Location Information Request 202 to the HSS according to normal IMS procedures. The HSS determines that the Tel URI matches a PSI wildcard, and responds with a Location Information Answer 203 to the I-CSCF with the identity of the allocated S-CSCF. The same mechanism is used here that is used for a not yet registered terminal having at least subscribed to one application. The I-CSCF forwards the SIP message 204 to the allocated S-CSCF. The message looks then like;

```
****************************************************************
INVITE Tel: +31161255678
From: Alice <Tel: 8501234>
To: Bob <Tel: 8515678; phone-context=enterprise1.com>
P-Asserted-Identity: Tel: +31161241234
****************************************************************
```

Next the S-CSCF act as it would act for a not yet registered terminal. It obtains the User profile from the HSS that contains at least one service profile with a matching wild carded PSI from the HSS. This profile includes an IFC trigger which causes the S-CSCF to route the message 205 to a Business Trunking application server (BT-AS). The application server replaces the SIP request URI "Tel: +31161255678" with the address of IP-PBX 2, namely "pbx2@operator2.com", and inserts the destination address into the To header field, deleting the previous content which is now lost. The returned message 206 look now like;

```
****************************************************************
INVITE PBX2@operator2.com
From: Alice <Tel: 8501234>
To: Tel: +31161255678
P-Asserted-Identity: Tel: +31161241234
****************************************************************
```

As now a new URL is in the INVITE requested field, the S-CSCF has to forward the message 207 as received from the BT-AS to an I-CSCF as the request URI has changed and hence a new terminating party is targeted. The message then arrives at a further I-CSCF which does a Location Information Request 208 to the HSS to determine the S-CSCF allocated to IP-PBX2 before delivering the message to that allocated S-CSCF. The HSS provides a Location Information Answer 209 and the I-CSCF forwards the INVITE message 210 to the S-CSCF.

As IP-PBX2 is most likely already registered the S-CSCF knows the contact address for IP-PBX2. Before sending the INVITE request to the P-CSCF for IP-PBX2 first the iFCs in the service profiles of the user profile for IP-PBX2 are checked for triggers to further IMS applications as indicated as an option by message 211 and return message 212. When no triggers or after response of the last application, the S-CSCF adds the contact address for IP-PBX2 as the new requested URI. In order to preserve the old URI, "pbx2@operator2.com", the S-CSCF adds a P-Called-Party-Id containing this URI. The message 213 forwarded to the P-CSCF now looks like;

```
****************************************************************
INVITE PBX2-contact-address
From: Alice <Tel: 8501234>
To: Tel: +31161255678
P-Asserted-Identity: Tel: +31161241234
P-Called-Party-ID: PBX2@operator2.com
****************************************************************
```

The P-CSCF forwards the message 214 to IP-PBX2 as instructed in the INVITE header The IP-PBX2 is responsible for setting up the connection to the terminal of Bob trough the corporate network of enterprise2. In the case where the destination terminal is a SIP terminal, upon receipt of the message, IP-PBX 2 can arrange for delivery of the message to the terminal based upon the address contained in the "To" header field. If the destination terminal is not a SIP terminal, the IP-PBX 2 terminal will handle the termination according to some application specific logic.

The "workaround" solution illustrated in FIG. 2 has the disadvantage that it requires two traversals of a CSCF complex. This will result in increased message transit times. In addition, the information originally contained in the "To" header is lost, as is the original request URI that was inserted by the caller. Without the original "To" header, certain applications at the called terminal may not function. In addition the workaround requires that a BT application or something with similar function must available to be able to create a correct P-Asserted-ID.

Instead of an IP-PBX as given in this workaround the company can use a standard RFC 3261 SIP proxy server for SIP enabled mobile terminals. Also in this case the company can have a group subscription to IMS rather then individual subscriptions. The basic operation for a SIP proxy server is identical to that for an IP-PBX in that for a call terminating case the requested URI should contain the address of the SIP proxy server. It is to the SIP proxy server to retrieve the final destination from the "To" header.

The main problem of the above described workarounds is that the original requested URI is replaced by the IP-PBX or SIP proxy server address in case of group subscriptions. To be able to route the invite message to the final destination modifications are required in the IP-PBX or SIP proxy server that work according the RFC 3261 standard as this standard expects the final destination to be in the requested URI.

Where it would be possible to design workarounds for specific cases this introduces also a more essential problem. When adapting nodes of the IMS they must be capable of handling both, users that require a work around and those not needing it as they can be handled in a standard way. Nodes could be made specific for dedicated user groups but from an operational point of view this situation is unwanted.

SUMMARY

The main object of the present invention is to provide a method, system and nodes which enable an IP Multimedia Subsystem to adapt its functioning in regard to certain users categories.

This objective is achieved with adding functioning instructions to IMS subscriptions for nodes of the IP Multimedia Subsystem in order to change the nodes standard functioning in regard to users of the IMS subscriptions.

As an option subscriptions in addition contain an indicator for nodes of the IP Multimedia Subsystem to indicate that a subscription contains such functioning instructions.

The description further discloses different types of functioning instructions.

A further aspect the description discloses an improved solution for the problem retaining a requested URI in terminating INVITE requests when serving users behind a RFC 3261 standard corporate IP-PBX or SIP proxy server having a single subscription making use of functioning instructions in that subscription. The improved solution comprising an instruction for an S-CSCF to copy a requested URI to a P-Called-Party-Identity header, and replacing the Requested URI with a contact address of an access point.

This improved solution is achieved in first instance with a modified registration of an access point to a separated non IMS network, like an IP-PBX or SIP proxy server, in an IMS network where either the subscription contains information on how message headers to be received by the access point shall be formatted related to the final destination of the message in the separated non IMS network, or this is contained in an information element provided by the access point to the IMS during the registration procedure.

In second instance this improved solution is achieved with a modified protocol between the IMS and an access point where related to messages sent by the IMS to the access point for subsequent transport trough the separated non IMS network to the final destination, according to functioning instructions provided by the user profile in the modified registration.

In third instance this improved solution is achieved by including within the Implicit Registration Set associated with a subscription, a wildcarded Public User Identity. "Wildcarded" or "wildcard" is understood here to mean a Public User Identity that contains a symbol or symbols that stands for one or more unspecified characters. The wildcarded Public User Identity will have a service profile associated with it. Any node within the IP Multimedia Subsystem which performs checks or processing based upon the Implicit Registration Set, will act upon a received Public User Identity matching a wildcarded Public User Identity in the same way as if the received Public User Identity matched any standard Public User Identity within the Implicit Registration Set. Rather than representing a range of Public User Identities using a wildcarded Public User Identities, such a range may instead be represented by a sub-domain. For example, a range of Tel URIs may be represented by a dialing prefix, whilst a range of SIP URIs may be represented by a corporate domain.

Characterizing for all 3 instances is that the instructions for the nodes of the IMS to change their standard way of functioning to this alternative way are contained in the subscription. As a further option the subscription may contain a special instruction allowing the update of certain elements of the subscription at registration of a user equipment or access node with this subscription.

According to a further aspect of the present invention there is provided a method of facilitating access to services of an IP Multimedia Subsystem network by user terminals located behind an access point to said network. The access point is associated with a subscription to the IP Multimedia Subsystem network. The method comprises including within an Implicit Registration Set defined for said subscription, a wildcarded Public User Identity or Public User Identity sub-domain representative of a range of Public User Identities. At IP Multimedia Subsystem registration of said access point with the IP Multimedia Subsystem network, the Public User Identities contained in the Implicit Registration Set or those provided in the special information element in the registration request message are distributed to a Serving Call Session Control Function allocated to said access point and to a Proxy Call Session Control Function to which said access point is attached.

Embodiments of the present invention make it possible to provide user terminals located within a corporate network or the like, and which do not themselves have IP Multimedia Subsystem subscriptions, with IP Multimedia Subsystem services including direct incoming and outgoing dialing. No additional S-CSCF complex traversals are required for signalling, and, important SIP header information is preserved.

Further aspects of the invention relate to a Serving Call Session Control Function, a Proxy Call Session Control Function, and a Home Subscriber Server, and methods of operating the same.

According to yet another aspect of the present invention there is provided a method of operating a Home Subscriber Server of an IP Multimedia Subsystem. The method comprises maintaining in respect of a subscription or service(s), data including an Implicit Registration Set containing a wildcarded Public Service Identity or Public Service Identity sub-domain representative of a range of Public Service Identities associated with a service or services, a rule set for formatting headers of messages send to access points for subsequent transport to user terminals behind the access point, and an identity of a Serving Call Session Control Function allocated to said service(s) or criteria for allocating a Serving Call Session Control Function. Upon receipt of a location information request from an Interrogating Call Session Control Function in respect of a SIP message received at the Interrogating Call Session Control Function, if the request URI of the message matches said wildcarded Public Service Identity or sub-domain, the Interrogating Call Session Control Function is informed of the identity of the Serving Call Session Control Function or provided with the selection criteria.

A further aspect of the invention provide for a computer program product loadable into the internal memory of a digital computer, comprising software code portions for performing the steps of the above method of operating a Home Subscriber Server. Further aspects provide for computer program products loadable into the internal memory of a digital computer, comprising software code portions for performing the steps of operating a Serving Call Session Control Function, a Proxy Call Session Control Function, and an Interrogating Call Session Control Function in accordance with the present invention.

DETAILED DESCRIPTION

The described solutions and the embodiments provide an IMS where nodes are more flexible in performing their function in the IMS so that can serve groups of users that require different handling without nodes being specific for only one such a user group.

An example of such a group of users is a group of users connected to the IMS via an access point. The access point having a single subscription and requires a single registration but the individual users are individual identifiable inside the IMS. The IMS must herein be flexible as to be able to work with a large variety of access points as it is still the access point that performs the act of registration on behalf of the group it represents. A group having a single subscription is only one example of subscriptions that need different treatment by the nodes of the IMS. Other examples are temporarily assigned subscription for terminals in other networks not having a subscription or users that do have an IMS subscription but their terminal is connected via another non IMS network to the IMS.

Including functioning instructions for the nodes of the IMS in the subscription, or allowing these to be set at registration time, provide the required flexibility. The functioning instructions change the standard functioning of IMS nodes for a specific group of users associated with that subscription.

The actual behaviour of the IMS towards an access point must at the latest be determined at the registration. Until that moment the IMS can have a UE independent (standard) behaviour. On the other side all CSCF nodes in the IMS as well as other nodes like the HSS shall not be tailored to perform special functions only. They shall adept there behaviour for a URI served at that moment rather then only serve special URI's This will keep the possibility of balancing of load throughout the IMS.

Detailed examples of alternative functioning of nodes, as determined at registration, are described by means of 3 registration situations, 2 originating/calling situations and 2 terminating/called situations.

Figure 5:
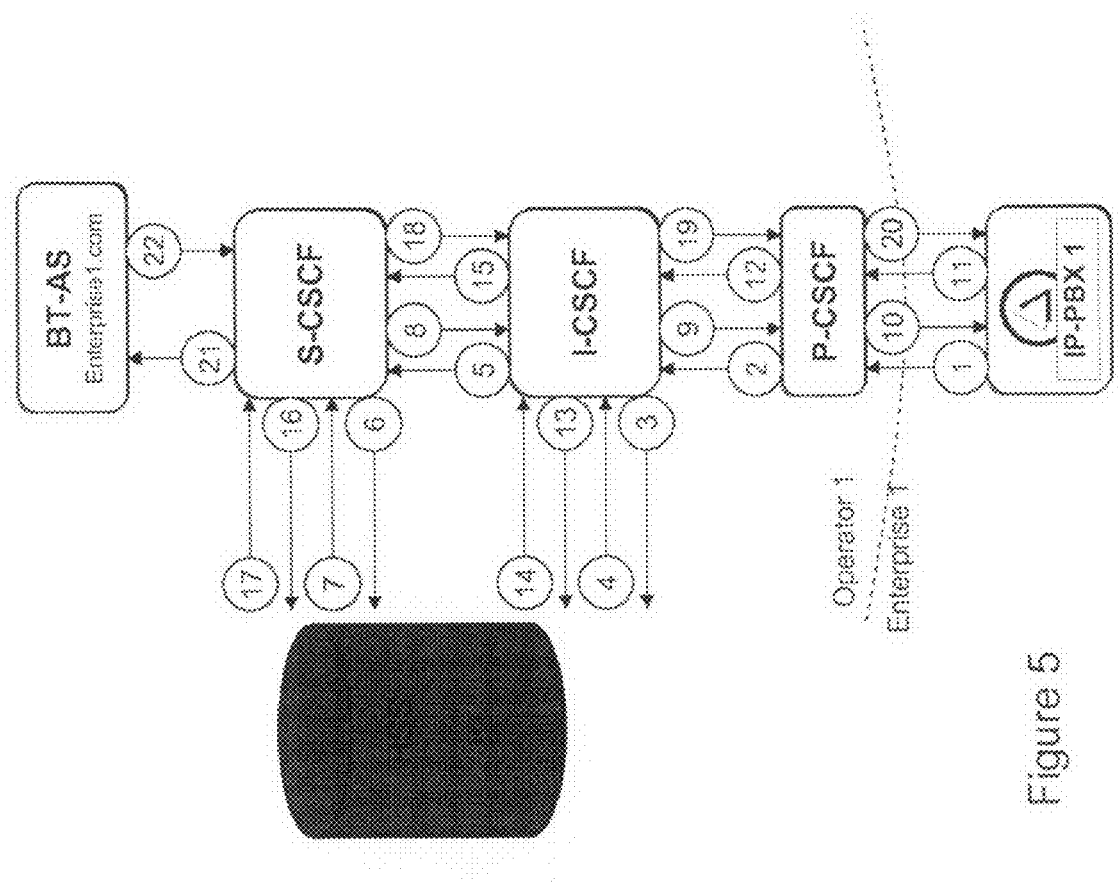
FIG. 5 illustrates schematically an IMS architecture with a registration signalling flow for an IP-PBX according to an embodiment of the present invention.

The first registration situation is outlined in FIG. 5 where a PBX, IP-PBX1, registers on behalf of a group of terminals. The IP-PBX1 own identity is "PBX1@operator1.com". The number range for the represented group is +31 161 24 XXXX. The message numbers in FIG. 5 correspond with those of FIG. 2. The message sequence is fully identical; the IP-PBX registers in the same way as the UE in FIG. 2. Main difference is that the subscription contains now elements that make the IMS behave differently then for a normal UE. The first difference is that instead of normal PUI's now the subscription in the HSS for IP-PBX1 contains a wildcard PUI in addition to IP-PBX1 own URI. In this specific case the wildcard URI is a Tel URI; "tel: +3116124!*!" the symbol sequence !*! indicates any number of 4 digits. Any Tel URI that matches the wildcard is implicitly registered when IP-PBX1 registers under his main PUI "pbx1@operator1.com". Instead of one single wildcard URI also sub ranges of numbers may be used also in combination with Tel URI's without wildcard. This will allow using different service profiles for different sub ranges or dedicated numbers. Care must however be taken that any matching URI always has only one Service Profile associated. Although now it is facilitated that by implicit registration terminals behind the IP-PBX1 are recognized by the IMS still message from the IMS shall pass through the IP-PBX which will in turn pass them to the terminals. This may include modification of the messages due to corporate network constraints. As the main procedures of using SIP messages may not change, the value of fields can however be modified for purposes of suiting the needs of the IP-PBX1 as long as basic operations of the IMS are not jeopardized. In practise such modifications will be limited to the P-CSCF and S-CSCF as REGISTER messages are excluded. A detailed method of implementation by means of rules sets is given at the end of the detailed description.

Figure 6:
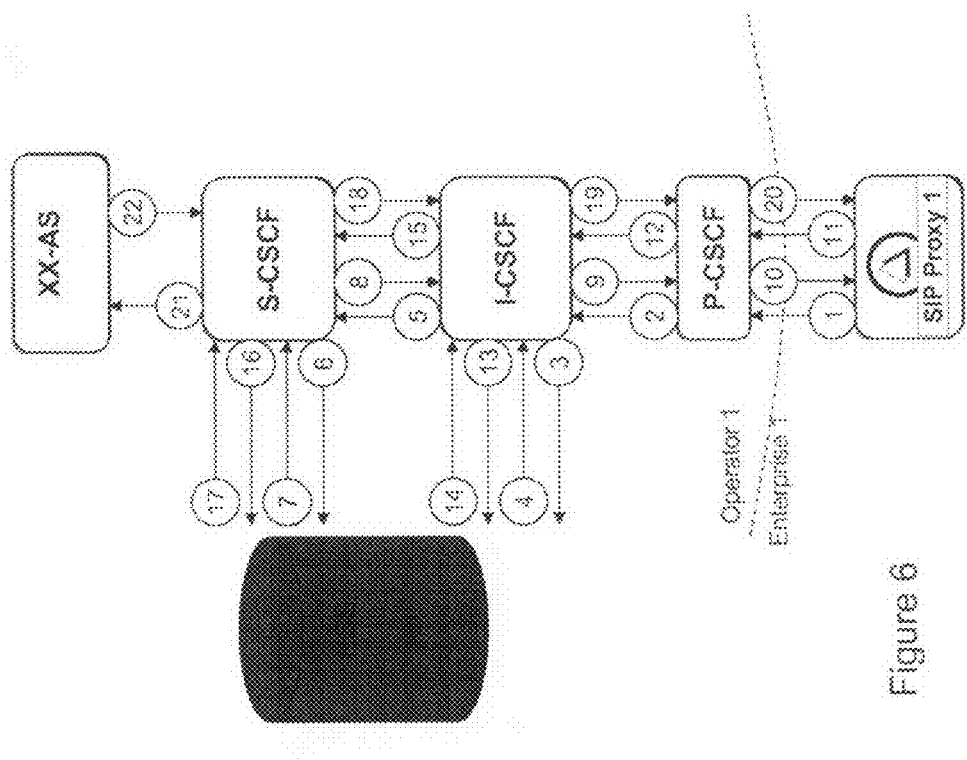
FIG. 6 illustrates schematically an IMS architecture with a registration signalling flow for a SIP proxy according to an embodiment of the present invention.

A second registration situation is given by FIG. 6. Here a corporate SIP Proxy Server registers on behalf of SIP terminals connected to it via the corporate network. The range of URIs for the SIP terminals is "XXXXXXXX@enterprise1.com". The own PUI of the SIP Proxy server is "pbx1@operator1.com". The proxy server may be an RFC 3261 standard server or specially adapted for the needs of the corporate network. Again the registration is fully comparable to that of a regular UE. The Proxy server registers itself like an UE. Message numbers in FIG. 6 correspond to that of FIGS. 2 and 5. Again the difference is in the subscription. As for the IP-PBX the subscription contains next to the own PUI of the proxy server also wildcard PUI's. In general form this is a SIP URI wildcard that can look like "!#!@enterprise1.com". The symbols !#! denotes a string of alphanumerical characters. Again any SIP URI matching the wildcard SIP URI is implicitly registered when the proxy server it self registers.

Also here alphanumeric sub ranges can be used giving a mix of wild carded SIP URI's and non wild carded SIP URI's which can be associated to different service profiles. One good example is that of an administrator having a non wild carded SIP URI special iFC's to be able to set parameters in IMS applications. Although not mentioned also Tel URI's can be added either as wild carded or as non wild carded as described before with FIG. 5.

Figure 7:
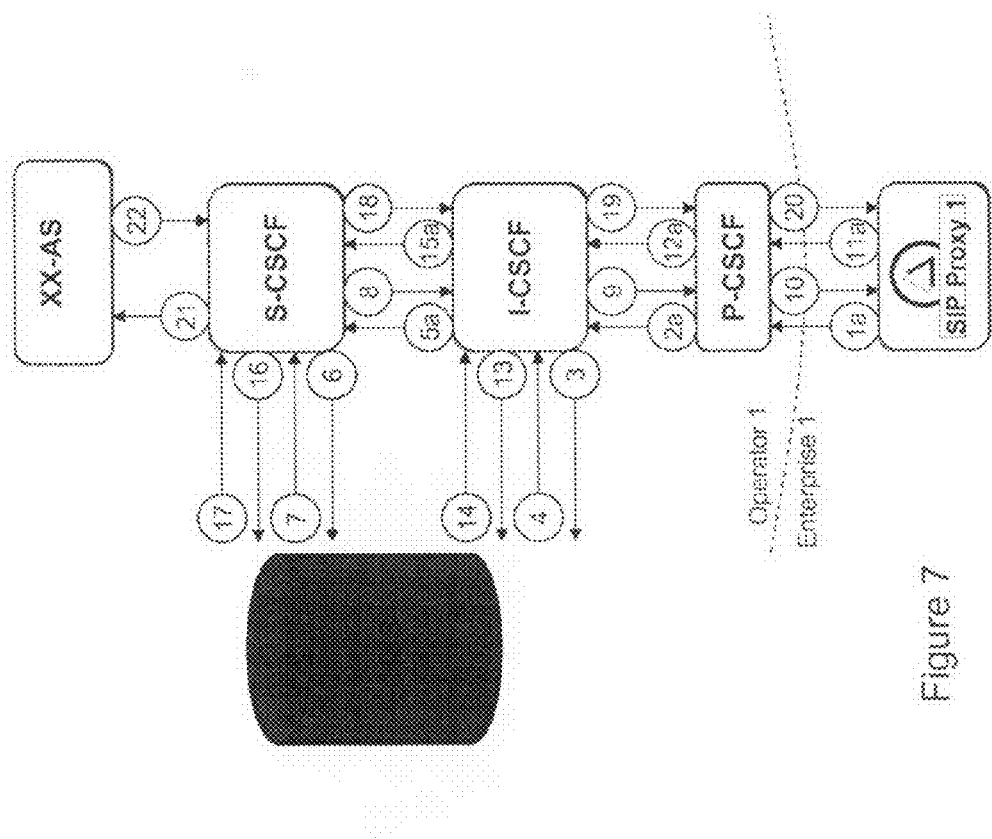
FIG. 7 illustrates schematically an IMS architecture with a registration signalling flow for a SIP proxy with registration based update.

A third registration situation is given by FIG. 7. Here a corporate SIP Proxy Server registers on behalf of SIP terminals connected to it via the corporate network. The range of URIs for the SIP terminals is "XXXXXXXX@enterprise1.com". The own PUI of the SIP Proxy server is "pbx1@operator1.com". The proxy server may be an RFC 3261 standard server or specially adapted for the needs of the corporate network. Again the registration is fully comparable to that of a regular UE. The Proxy server registers itself like an UE. Message numbers in FIG. 7 correspond to that of FIGS. 2, 5 and 6. Messages that are different have an "a" as suffix.

In the first and second registration situation the behaviour controlling elements were contained in the subscription. In the third situation initially they may be contained in the subscription but during the registration the access node, here the SIP proxy server, provides an updated set of elements that will overwrite the values in the subscription. This may be specific advantageously for example when the administrator function in enterprise 1 changes to another person. To maintain the special service profile for the new person performing the administrator function it is then not required to change the subscription. Especially at larger companies changes in functions will be quite frequent.

Although the profile is updated at S-CSCF the HSS is interrogated by the I-CSCF in called/terminating cases. For this it is required that the HSS contains at least a maximum wildcard PUI to be able to recognize that a terminal is served by an access point and allocate the proper S-CSCF for it.

The update may have the form of a complete user profile or specific elements of that. More detailed examples are given at the end of the detailed description. The update information must be contained in the SIP register messages. Below an example is given where the update information is contained in the Contact field. Message 1a and 11a now look like;

```
****************************************************************
REGISTER sip: operator1.com
Via: <current IP pbx1>;
Route: <current IP address of P-CSCF>
Max-Forwards: 50
From: pbx1@operator1.com
To: pbx1@operator1.com
Contact: <current IP pbx1>; expires=2000;update=<update information>
Call-ID: grt38u6yqr54gfkp98y6t3rr
CSeq: 25 REGISTER
Content-Length: 0
****************************************************************
```

Note that only the Contact field differs from the normal message format for registration. As the contact field is kept throughout the flow towards the S-CSCF messages 2a, 5a, 12a and 15a have the same addition to the Contact field. The S-CSCF is specially adapted to recognize the "update=" in the Contact field and to perform the update. As an operator may want to exclude that every UE has the feature of updating, a special indication can be added to the subscription that enables the update feature in the S-CSCF. The S-CSCF updates the user profile obtained from the HSS with the update information. This is done before the registration of the prime PUI with the IMS services, messages 21 and 22. It is also an operator policy to allow additional update at re-registration and have the S-CSCF adapted for this.

Where a PBX or SIP proxy server is denoted in the registration also any other type access point can be read. The basic registration method for a group subscription is identical for all types of access points. Rather than the PBX or SIP proxy server performing the registration it self, this could be performed by a function that registers on behalf of the PBX or SIP proxy server. Such function could for example be located in a border node such as a Signalling Border Gateway. The border node may be located between the PBX or SIP proxy server and the P-CSCF or may contain the P-CSCF. Another example of a device that could host the registration function is an Integrated Access Device or Home Gateway at the customer premises.

Figure 3:
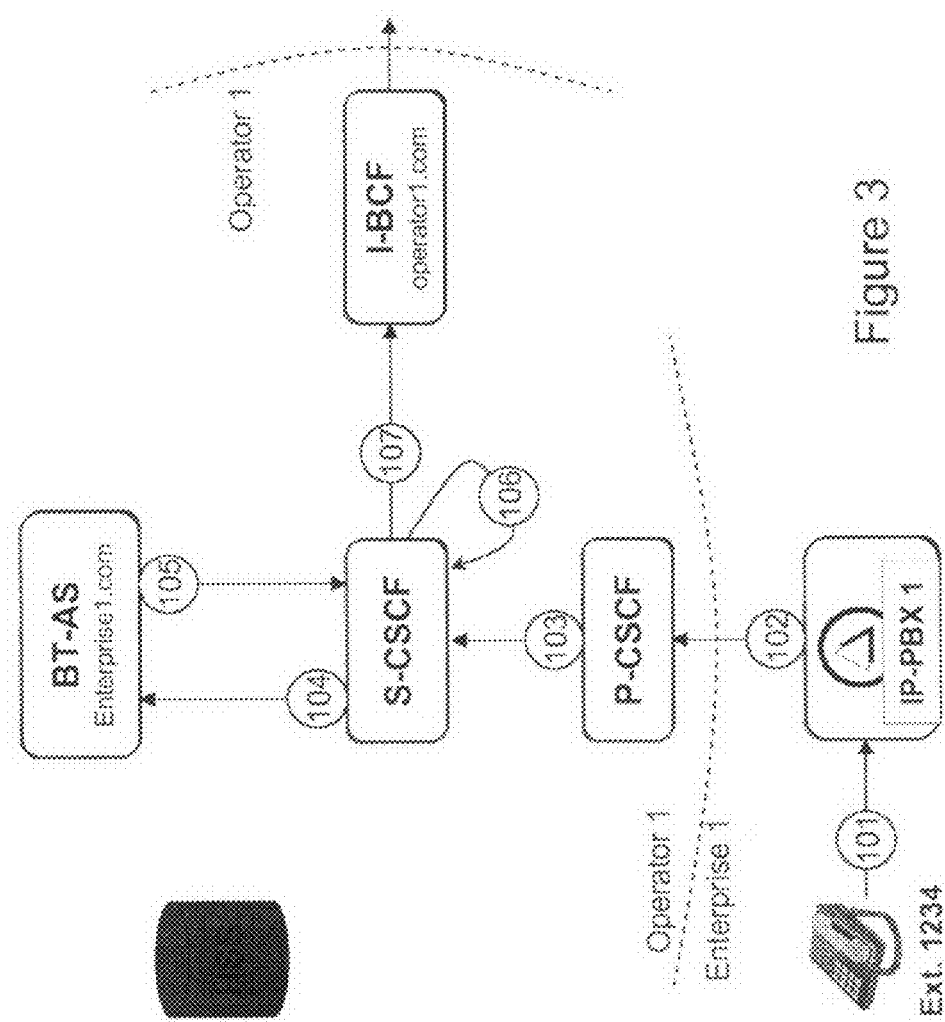
FIG. 3 illustrates schematically a prior art workaround solution for an originating call case within an IMS architecture according to the prior art.
Figure 8:
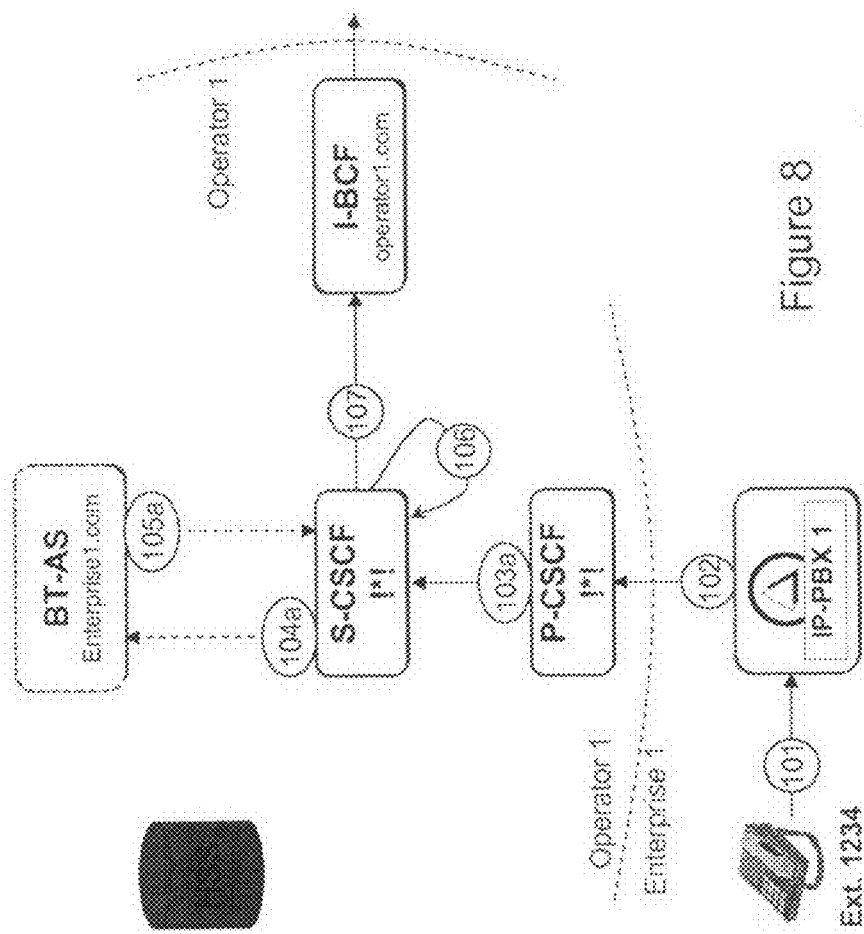
FIG. 8 illustrates schematically an IMS architecture with an originating case signalling flow for an IP-PBX according to an embodiment of the present invention based on originating Tel URI.

A first originating/calling case according to the invention is given by FIG. 8. Message numbers are identical to the workaround messages given by FIG. 3, only there where a substantial difference a suffix "a" is added to the message number. The IP-PBX1 belongs to enterprise1) and has as own PUI "PBX1@operator1.com". IP-PBX1 has as group code 850 and as number range +31 161 24 xxxx. An employee Alice requests to set up a session from her terminal with extension 1234 to Bob at enterprise 2 having extension 5678 behind a IP-PBX 2 with group code 851 as defined by IP-PBX1.

The request 101 of Alice is received at IP-PBX1 that assembles the outgoing request 102 towards the P-CSCF. The format of the message looks like;

```
**************************************************************
INVITE Tel: +31161255678
From: Alice <Tel: 8501234>
To: Bob <Tel: 8515678; phone-context=enterprise1.com>
P-Preferred-Identity: Tel: +31161241234
**************************************************************
```

When now received by the outbound P-CSCF it does recognise the P-Preferred-Identity contained within the INVITE based on the implicit registration set that contains the wildcard PUI. It now sets P-Asserted-Identity identical to the P-Preferred-Identity. The message 103a now send by the P-CSCF to the S-CSCF looks like;

```
**************************************************************
INVITE Tel: +31161255678
From: Alice <Tel: 8501234>
To: Bob <Tel: 8515678; phone-context=enterprise1.com>
P-Asserted-Identity: Tel: +31161241234
**************************************************************
```

At the S-CSCF, it uses the P-Asserted-Identity of the message to check the user profile having as PUI the Tel URI of the P-Asserted-Identity. It still might go to the BT-AS as so instructed by the iFC belonging to the service profile associated with the PUI of Alice but this is no longer required to obtain a correct P-Asserted-Identity for Alice. Initial Filter Criteria are not to be mistaken as instructions in the sense of controlling the functioning of nodes. They are merely mend for selecting IMS services which might or might not be rendered to a user. Example why to go to the BT-AS anyhow is to translate the From and To field to the full Tel URI of Alice & Bob instead of the number according IP-PBX1 context.

Back at the S-CSCF it has to perform an ENUM lookup 106 to translate the requested Tel URI into a known SIP URI. The adapted INVITE message 107 is then send to the Interconnected Border Control Function, (I-BCF) of operator 1 for further transport to the network of operator 2. The finally INVITE message looks like;

```
**************************************************************
INVITE SIP: +31161255678@operator2.com;user=phone
From: Alice <Tel: +31161241234>
To: Bob <Tel: +31161255678>
P-Asserted-Identity: Tel: +31161241234
**************************************************************
```

Figure 9:
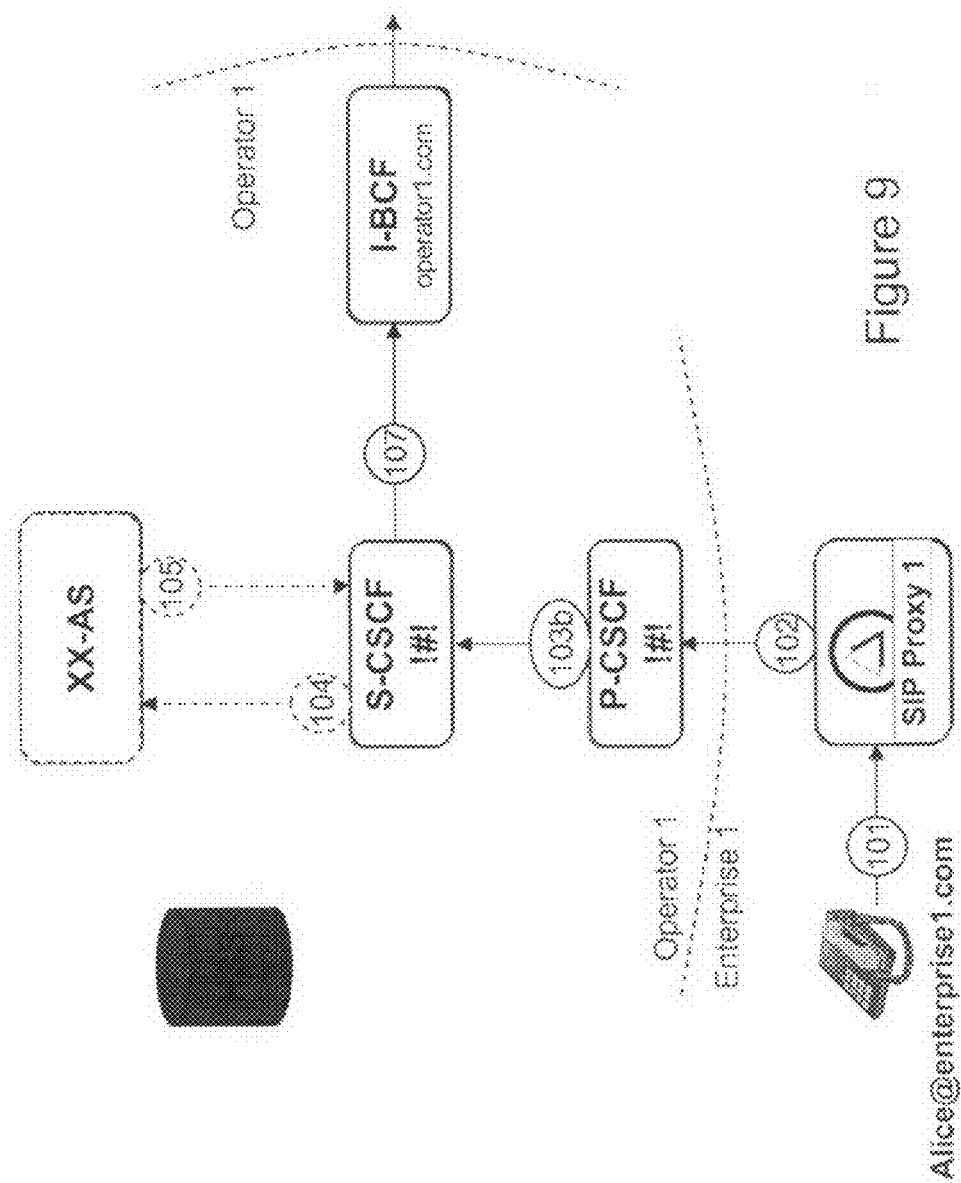
FIG. 9 illustrates schematically an IMS architecture with an originating case signalling flow for an IP-PBX according to an embodiment of the present invention based on originating SIP-URI.

A second originating/calling case according to the invention is given by FIG. 9. Message numbers are identical to the workaround messages given by FIG. 3, only there where a substantial difference a suffix "b" is added to the message number. The SIP proxy server belongs to enterprise1) and has as own PUI "PBX1@operator1.com". The SIP proxy server acts on behalf of a range of SIP URIs "!#!@enterprise1.com" An employee Alice requests to set up a session from her terminal with SIP URI alice@enterprise1.com to Bob at enterprise 2 having SIP URI "bob@interprise2.com" handled by a SIP proxy server at enterprise 2.

The request 101 of Alice is received at IP-PBX1 that assembles the outgoing request 102 towards the P-CSCF. The format of the message looks like;

```
**************************************************************
INVITE SIP: bob@interprise2.com
From: Alice < alice@enterprise1.com >
To: Bob < bob@interprise2.com >
P-Preferred-Identity: alice@enterprise1.com
**************************************************************
```

Again when received by the outbound P-CSCF it does recognise the P-Preferred-Identity contained within the INVITE based on the implicit registration set that contains the wildcard PUI. It now sets P-Asserted-Identity identical to the P-Preferred-Identity. The message 103a now send by the P-CSCF to the S-CSCF looks like;

```
**************************************************************
INVITE SIP: bob@interprise2.com
From: Alice < alice@enterprise1.com >
To: Bob < bob@interprise2.com >
P-Asserted-Identity: alice@enterprise1.com
**************************************************************
```

At the S-CSCF, it uses the P-Asserted-Identity of the message to check the user profile having as PUI the SIP URI of the P-Asserted-Identity. It still might go to an XX-AS as so instructed by the iFC belonging to the service profile associated with the PUI of Alice but this is no longer required to obtain a correct P-Asserted-Identity for Alice. Call set up continues according to normal procedures. It will be noted that the Request URI, From, To, and P-Asserted-ID headers are not altered by the group handling operation (at least not in any manner that is different from that which occurs for normal, non-group users). Back at the S-CSCF it forwards the INVITE message 107 to the Interconnected Border Control Function, (I-BCF) of operator 1 for further transport to the network of operator 2. The finally INVITE message looks like;

```
****************************************************************
INVITE SIP: bob@interprise2.com
From: Alice < alice@enterprise1.com >
To: Bob < bob@interprise2.com >
P-Asserted-Identity: alice@enterprise1.com
****************************************************************
```

Figure 4:
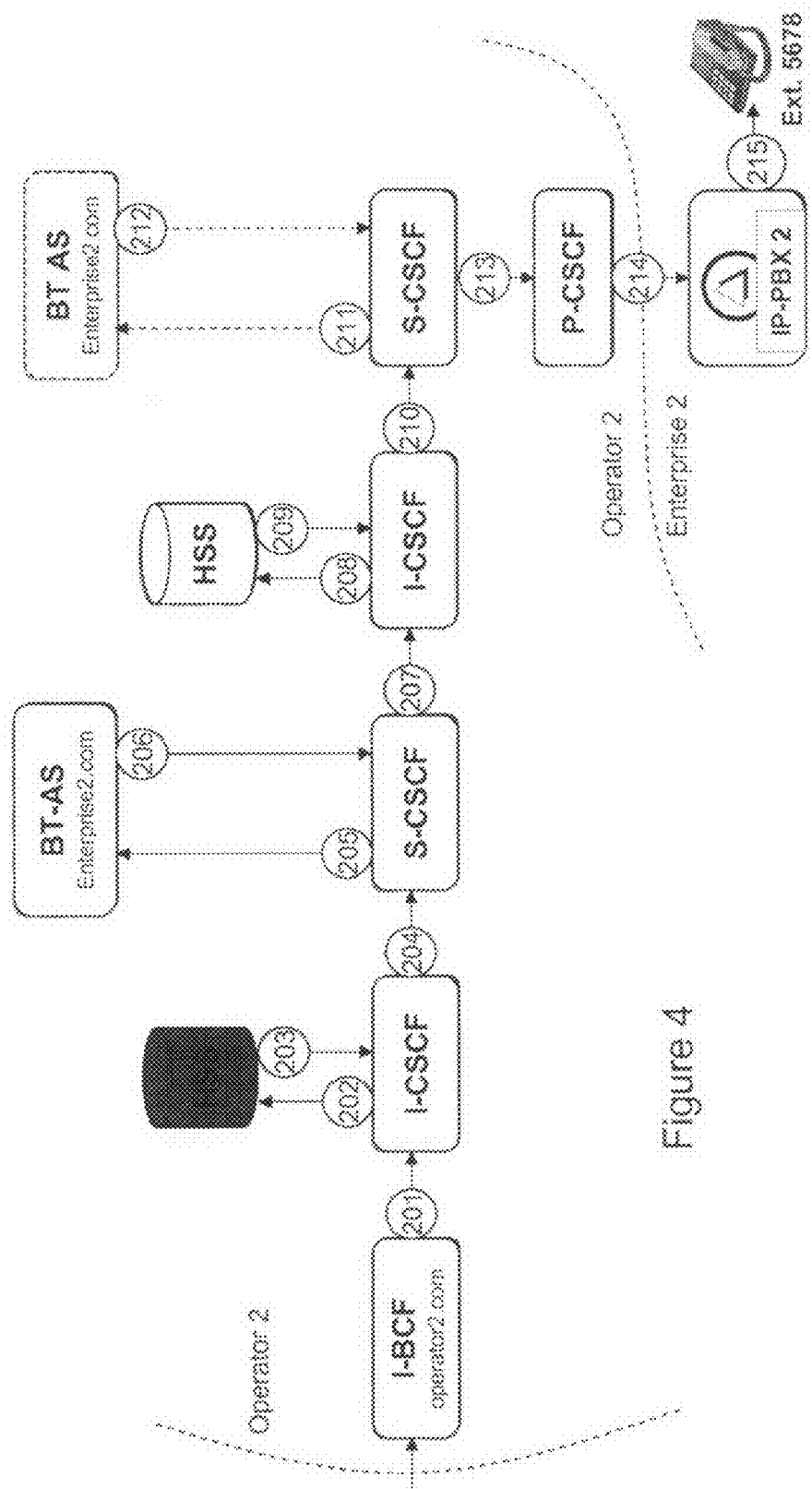
FIG. 4 illustrates schematically a prior art workaround solution for a terminating call case within an IMS architecture according to the prior art.
Figure 10:
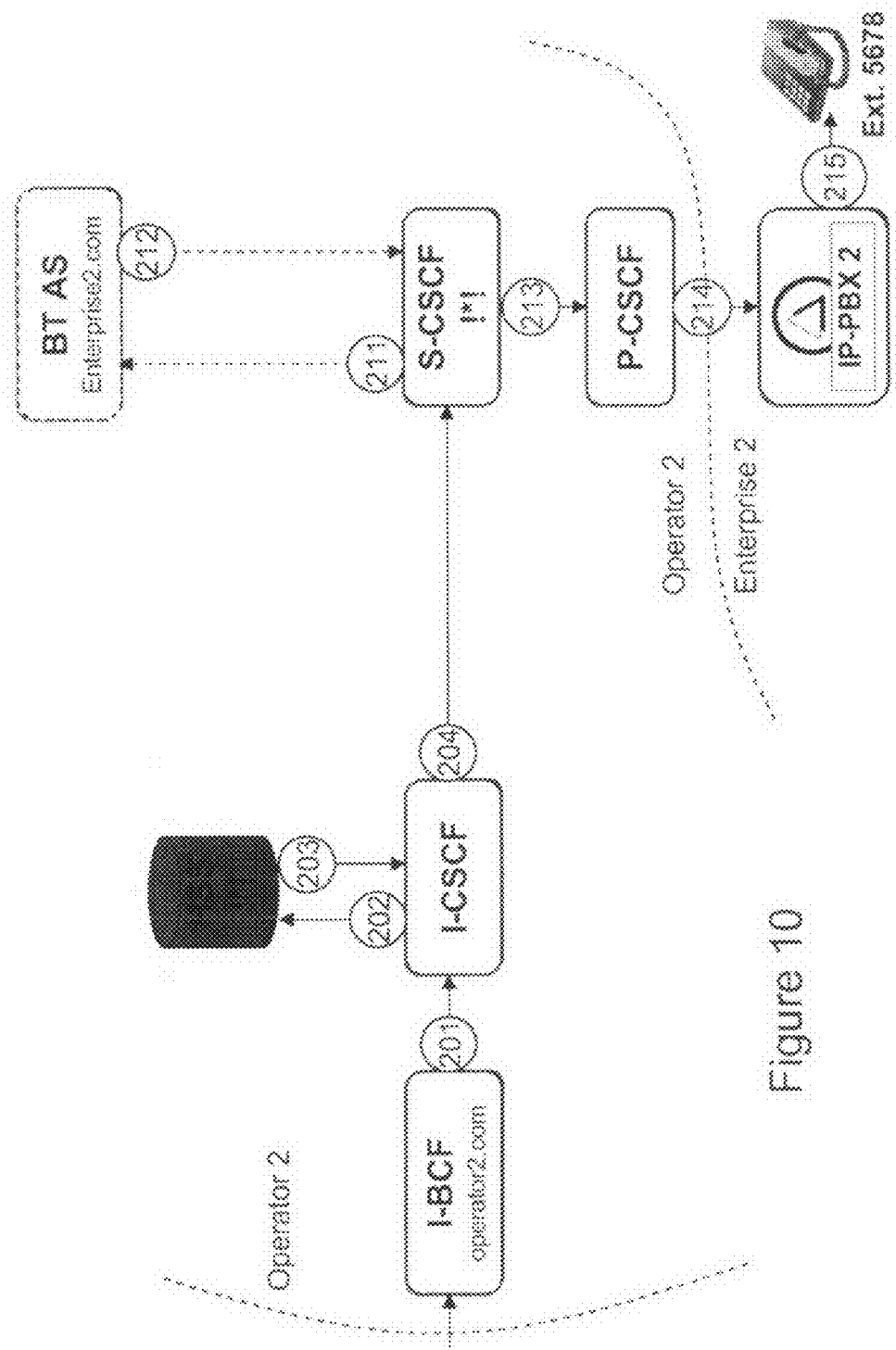
FIG. 10 illustrates an schematically IMS architecture with a terminating case signalling flow for a Tel URI addressed user connected to an IP-PBX, according to an embodiment of the present invention.

A first called/terminating case according to the invention is given by FIG. 10. Message numbers are identical to the workaround messages given by FIG. 4. The IP-PBX1 belongs to enterprise1) and has as own PUI "PBX1@operator1.com". IP-PBX1 has as group code 850 and as number range +31 161 24 xxxx. An employee Alice requests to set up a session from her terminal with extension 1234 to Bob at enterprise 2 having extension 5678 behind a IP-PBX 2 with group code 851 as defined by IP-PBX1. The INVITE message arrives at the I-BCF of operator 2 that forwards the message 201 to an I-CSCF. The message looks like;

```
****************************************************************
INVITE SIP: +31161255678@operator2.com;user=phone
From: Alice <Tel: +31161241234>
To: Bob <Tel: +31161255678>
P-Asserted-Identity: Tel: +31161241234
****************************************************************
```

The I-CSCF will recognise a SIP request URI corresponding to a telephone number and will convert this to a Tel URI. In this example of Alice to Bob connection, the SIP request URI is "sip:+31161255678@operator2.com, user=phone", and this is converted to the Tel URI "Tel: +31161255678". The I-CSCF then sends a Location Information Request 202 to the HSS according to normal IMS procedures. The HSS determines now that the Tel URI matches a PUI wildcard, and responds with a Location Information Answer 203 to the I-CSCF with the identity of the allocated S-CSCF. The I-CSCF forwards the SIP message 204 to the allocated S-CSCF. The message looks then like;

```
****************************************************************
INVITE Tel: +31161255678
From: Alice <Tel: 8501234>
To: Bob <Tel: +31161255678>
P-Asserted-Identity: Tel: +31161241234
****************************************************************
```

Next the S-CSCF act as it would act for a normal registered terminal. It recognizes the requested Tel URI as one matching a wildcard URI. The user profile is available at the S-CSCF. In principle the S-CSCF can directly forward to the P-CSCF with out the need to go first via the BT-AS. When the profile includes IFC triggers for IMS applications it still may optionally go via IMS applications. Here as example the translation of the external number format of Bob into a corporate number format for the IP-PBX2. When no triggers or after response of the last application, the S-CSCF can forward the message to the relevant P-CSCF. Normally the invite header would contain the URI of the UE. Now the IP-PBX2 must be addressed as it takes care of delivering to the terminal. The S-CSCF changes its normal behaviour instructed so by special information in the user profile of IP-PBX2. It therefore adds the contact address for IP-PBX2 as the new requested URI. In order to preserve the old URI, the S-CSCF adds a P-Called-Party-Id containing this URI. The message 213 forwarded to the P-CSCF now looks like;

```
****************************************************************
INVITE PBX2-contact-address
From: Alice <Tel: 8501234>
To: Bob <Tel: 8515678>
P-Asserted-Identity: Tel: +31161241234
P-Called-Party-ID: Tel: +31161255678
****************************************************************
```

The P-CSCF forwards the message 214 to IP-PBX2 as instructed by the INVITE header. The IP-PBX2 is responsible for setting up the connection to the terminal of Bob trough the corporate network of enterprise2. In the case where the destination terminal is a SIP terminal, upon receipt of the message, IP-PBX 2 can arrange for delivery of the message to the terminal based upon the address contained in the "To" header field. If the destination terminal is not a SIP terminal, the IP-PBX 2 terminal will handle the termination according to some application specific logic.

Figure 11:
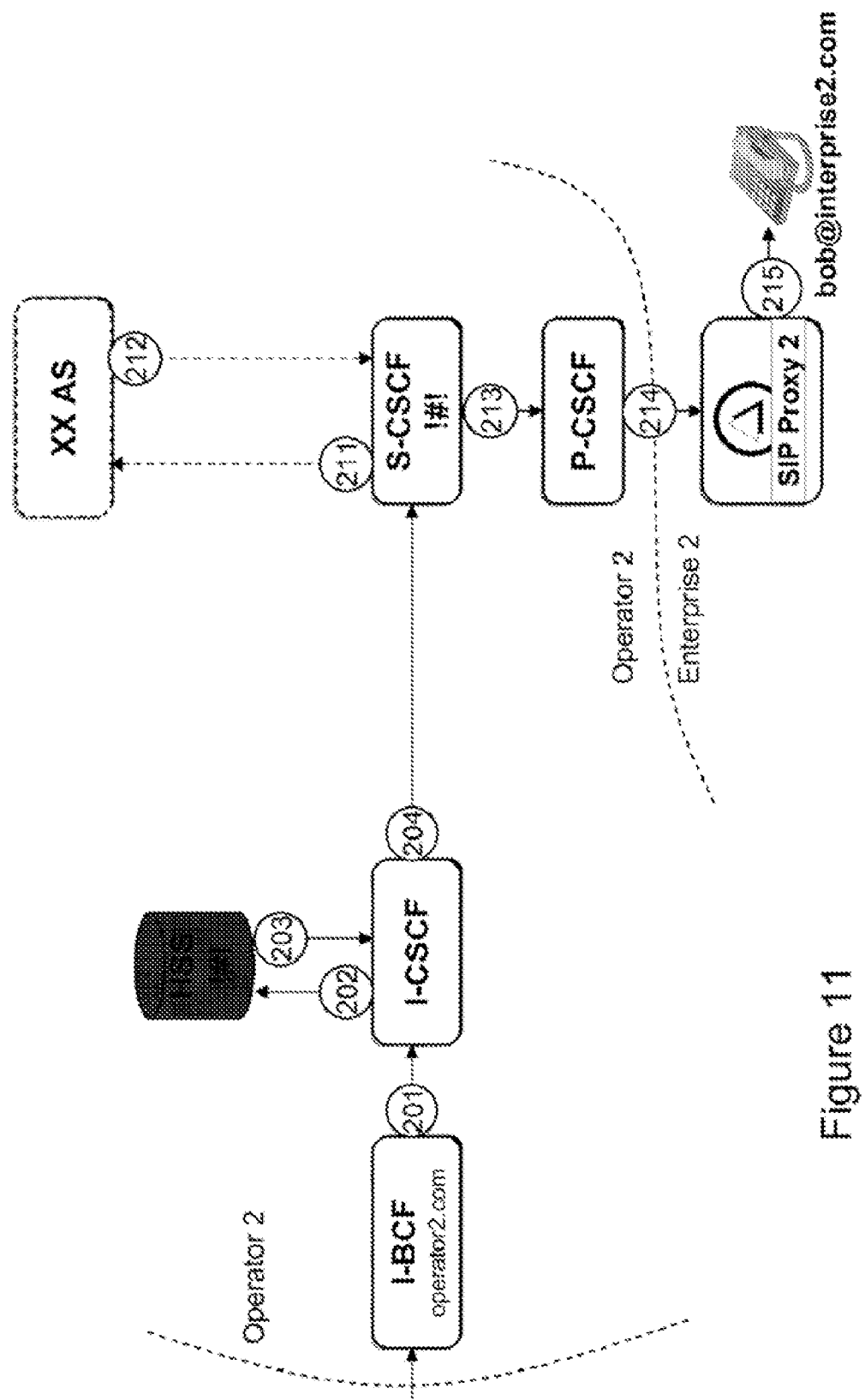
FIG. 11 illustrates an schematically IMS architecture with a terminating case signalling flow for a SIP URI addressed user connected to a SIP proxy, according to an embodiment of the present invention.

A second called/terminating case according to the invention is given by FIG. 11. Message numbers are identical to the workaround messages given by FIG. 4. The INVITE message arrives at the I-BCF of operator 2. Instead of Tel URI's the message contains now SIP URI's. The invite is still from Alice to Bob, only Bob resides now behind a SIP proxy server at enterprise 2. The I-BCF forwards the message 201 to an I-CSCF. The message looks like;

```
****************************************************************
INVITE SIP: bob@interprise2.com
From: Alice < alice@enterprise1.com >
To: Bob < bob@interprise2.com >
P-Asserted-Identity: alice@enterprise1.com
****************************************************************
```

Again the I-CSCF receives the invite message and interrogates the HSS. The HSS recognizes a math to a wildcard PUI and returns the correct S-CSCF to approach. The I-CSCF does not require translating as for the phone context in the first called/terminating case. It directly forwards the message 204 to the S-CSCF.

Next the S-CSCF act as it would act for a normal registered terminal. It recognizes the requested Tel URI as one matching a wildcard URI. The user profile is available at the S-CSCF. In principle the S-CSCF can directly forward to the P-CSCF with out the need to go first via the BT-AS. When the profile includes IFC triggers for IMS applications it still may optionally go via IMS applications. When no triggers or after response of the last application, the S-CSCF can forward the message to the relevant P-CSCF. Normally the invite header would contain the URI of the UE. Now the SIP proxy server must be addressed as it takes care of delivering to the terminal. The S-CSCF changes its normal behaviour instructed so by special information in the user profile of the SIP proxy server. It therefore adds the contact address for the SIP proxy server as additional route field behind the route field for directing it to the P-CSCF. The S-CSCF may add still a P-Called-Party-Id containing the requested URI but this in not required. The message 213 forwarded to the P-CSCF now looks like;

```
********************************************************************
INVITE SIP: bob@interprise2.com
From: Alice < alice@enterprise1.com >
To: Bob < bob@interprise2.com >
P-Asserted-Identity: alice@enterprise1.com
Route: pcscf2.operator.com
Route: pbx2-contact-address
********************************************************************
```

The P-CSCF removes when it receives the message its own route field and then forwards the message 214 to the SIP proxy server of enterprise 2 as instructed by the next following route header. The SIP proxy server of enterprise 2 is responsible for setting up the connection to the terminal of Bob trough the corporate network of enterprise2. In the case where the destination terminal is a SIP terminal, SIP proxy server of enterprise 2 can directly deliver the message to the terminal. If the destination terminal is not a SIP terminal, the SIP proxy server of enterprise 2 will handle the termination according to some application specific logic.

In the previous cases several ways of alternative behaviour of IMS nodes is described like recognize wildcards symbols in URI's and deploy them, or adapt the standard formatting of messages to a specific format. Normally this could be fully hard coded in the IMS node functions. It is however the subject of the invention that such alternative behaviour is only performed when needed. Therefore the subscription as contained in the HSS may comprise a first indicator allowing such alternative behaviour.

This first indicator helps the performance of the IMS as each node does not need to scan the whole subscription or user profile but can check first this indicator. It is also a token for the S-CSCF to include the instructions as stated below in the user profile send to other nodes in the IMS.

The second information element in the subscription defines what alternative behaviour is expected, further denoted as a set of instructions or rule set. This second information element may be applicable in all cases, for certain user or service profiles, or dedicated to one PUI. This means that more then one set of instructions may be present and even hierarchical ways are possible.

When the node receives a user profile it checks for presence of the second type of information or alternatively first checks if the indicator is present. The node only retrieves instructions that are intended for it. Relevant functioning instructions are stored with each PUI registered and known by the node so that the functioning instruction is only executed in relation to that PUI. The PUI may be wild carded or be a sub range so the instruction is valid for all matching PUI's.

To give some more insight, the 2 examples of wildcard symbols rule and message formatting rule are discussed in some more detail.

The wildcard recognition is based on certain characters. This means that when hard coded these sequences may not occur where they were not intended. By means of the first indicator it is limited to only certain subscriptions that have set this parameter. The instruction belonging to it specifies the symbols and where they stand for. As example '!*!' means 4 digits or '!#' means 1-20 alphanumerical characters. In the first example it might be evident that when a PABX uses the 4 last digits is a different case then a PABX using only the last 3 digits.

An other example of an instruction is a formatting rule like for an S-CSCF where an IP-PBX requiring the Requested URI field to contain the final destination address (retain the original requested URI);

Put the SIP-URI of the IP-PBX that needs to receive the message from the P-CSCF in the route header below the route header of the P-CSCF.

Example of such a formatting rule for an S-CSCF where an IP-PBX requires the requested URI of the final destination to be in a P-Called-Party-ID header field;

Copy value of requested URI in to header field P-Called-Party-ID,

Replace requested URI field with the address of the IP-PBX to deliver the message to.

For formatting rules contents of one field is copied or moved to another. No content is generated. A possible syntax for a set of instructions is given by the example hereafter.

```
Instruction_set::=|<instruction_type> <instruction>,|
Instruction_type::= wildcard, format_rule, ...............
Instruction::=<wildcard_instruction>, <format_rule_instruction>,
   <registration_update_allowed>,.........
Wildcard_instruction::=<wildcard_pattern> <substitute>
Format_rule_instruction::= <sending_node> <receiving_node>
   <message_type>
   <source_field | source> <destination_field>
Registration_update_allowed::= Boolean
```

For the examples the instruction set would look like;

```
Wildcard; !*!, 4D
Wildcard; !#!, 1-20A
Format_rule; S-CSCF, P-CSCF, INVITE, registered_address, route
And
Wildcard; !*!, 4D
Wildcard; !#!, 1-20A
Format_rule; S-CSCF, P-CSCF, INVITE, requested-URI, P-Called-Party-ID,
Format_rule; S-CSCF, P-CSCF, INVITE, registered_address, requested-URI
```

The invention claimed is:

1. A method of operating a node of an IP Multimedia Subsystem (IMS), said IMS comprising nodes for performing predefined IMS functions, Application Servers (AS) for providing services to devices that access said IMS, and a Home Subscription Server (HSS) for holding user profiles for said devices, said method implemented by said node comprising the steps of:

receiving, in said node, a user profile related to a registration in the IMS of an access point on behalf of a group of user terminals service by said access point, where the user profile contains initial filter criteria (IFC) operative to trigger the provision of services for said access point;

determining, in said node, whether said user profile for said access point contains functioning instructions operative to change the predefined IMS functions of one or more IMS nodes and, if so, retrieving said functioning instructions from said user profile;

storing, in said node, said functioning instructions together with a registered Public User Identity for said access point; and, in response to receiving a request containing said Public User Identity for an IMS service, executing, in said node, said functioning instructions instead of said predefined IMS functions, wherein the user profile further contains a wildcard Public User Identity associated with the user terminals serviced by said access point, and wherein said functioning instructions comprise a formatting rule instruction that defines for a field of a message from a source node to a destination node in the IMS a location of a substitute content for that field.

2. The method recited in claim 1, wherein the step of determining whether said user profile contains functioning instructions comprises the steps of:
  determining that said user profile contains an indicator that functioning instructions are included therein; or
  scanning said user profile for said functioning instructions.

3. The method recited in claim 1, wherein said registration relates to the registration of an access point on behalf of a group of user terminals served by said access point.

4. The method recited in claim 1, wherein said registration relates to the registration of a single user terminal.

5. The method recited in claim 1, wherein said functioning instructions comprise a wildcard interpretation instruction that defines at least one wildcard representation symbol and an allowed substitution for that symbol.

6. The method recited in claim 1, wherein said functioning instructions comprise an update instruction operative to instruct a node to use a user profile update in a registration message to update a local stored profile.

7. A node of an IP Multimedia Subsystem (IMS), said IMS comprising nodes for performing predefined IMS functions, Application Servers (AS) for providing services to devices that access said IMS, and a Home Subscription Server (HSS) for holding user subscriptions for said devices, said node comprising:
  a digital computer and memory with a computer program that, in combination, are operative to:
  receive, in said node, a user profile related to a registration in the IMS of an access point on behalf of a group of user terminals service by said access point, where the user profile contains initial filter criteria (IFC) operative to trigger the provision of services for said access point;
  determine whether said user profile for said device contains functioning instructions operative to change the predefined IMS functions of one or more IMS nodes and, if so, retrieving said functioning instructions from said user profile;
  store said functioning instructions together with a registered Public User Identity for said access point; and,
  in response to receiving a request containing said Public User Identity for an IMS service, execute said functioning instructions instead of said predefined IMS functions, wherein the user profile further contains a wildcard Public User Identity associated with the user terminals serviced by said access point, and wherein said functioning instructions comprise a formatting rule instruction that defines for a field of a message from a source node to a destination node in the IMS a location of a substitute content for that field.

8. The node recited in claim 7, wherein determining whether said user profile contains functioning instructions comprises the steps of:
  determining that said user profile contains an indicator that functioning instructions are included therein; or
  scanning said user profile for said functioning instructions.

9. The node recited in claim 7, wherein said registration relates to the registration of an access point on behalf of a group of user terminals served by said access point.

10. The node recited in claim 7, wherein said registration relates to the registration of a single user terminal.

11. The node recited in claim 7, wherein said functioning instructions comprise a wildcard interpretation instruction that defines at least one wildcard representation symbol and an allowed substitution for that symbol.

12. The node recited in claim 7, wherein said functioning instructions comprise an update instruction operative to instruct a node to use a user profile update in a registration message to update a local stored profile.

\* \* \* \* \*

UNITED STATES PATENT AND TRADEMARK OFFICE
CERTIFICATE OF CORRECTION

| | | |
|---|---|---|
| PATENT NO. | : 8,260,957 B2 | Page 1 of 2 |
| APPLICATION NO. | : 12/528397 | |
| DATED | : September 4, 2012 | |
| INVENTOR(S) | : Van Elburg et al. | |

It is certified that error appears in the above-identified patent and that said Letters Patent is hereby corrected as shown below:

On the Title Page, Item (56), under "FOREIGN PATENT DOCUMENTS",
Line 1, delete "WO WO 2006/120303 11/2006".

On Title Page 2, Item (56), under "OTHER PUBLICATIONS", Line 2,
delete "Int erop-s ib1ey-s i p connect"" and insert -- Interop-sibley-sipconnect" --, therefor.

On Title Page 2, Item (56), under "OTHER PUBLICATIONS", Lines 6-9,
delete "Kim Lynggaard......................29-35.".

On Title Page 2, Item (56), under "OTHER PUBLICATIONS", Lines 10-11,
delete "Sibley C......................-sipconnect".".

Figure 1:
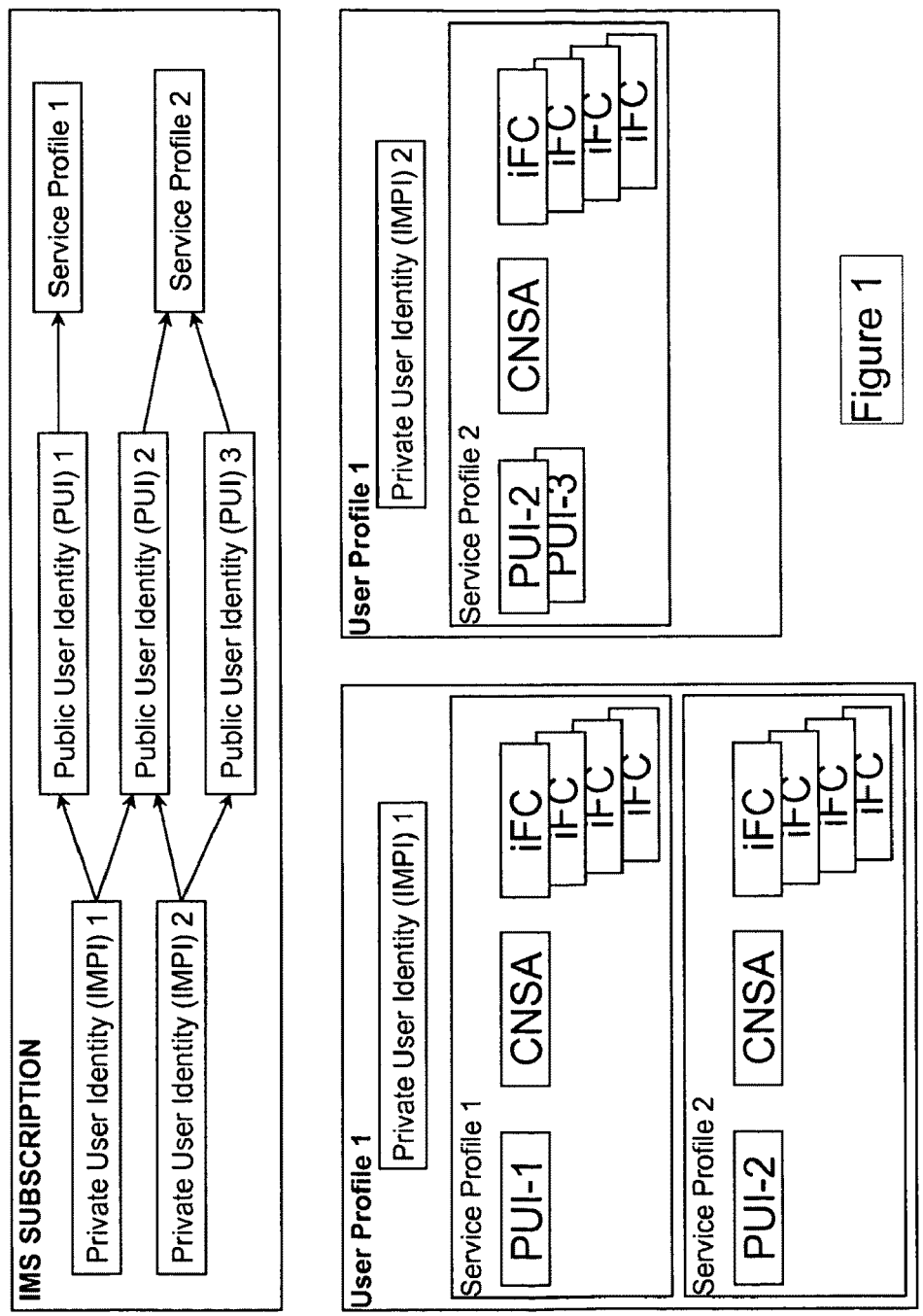
FIG. 1 illustrates schematically example relationships between a user IMS subscription and the Public and Private User Identities according to the prior art.
Figure 2:
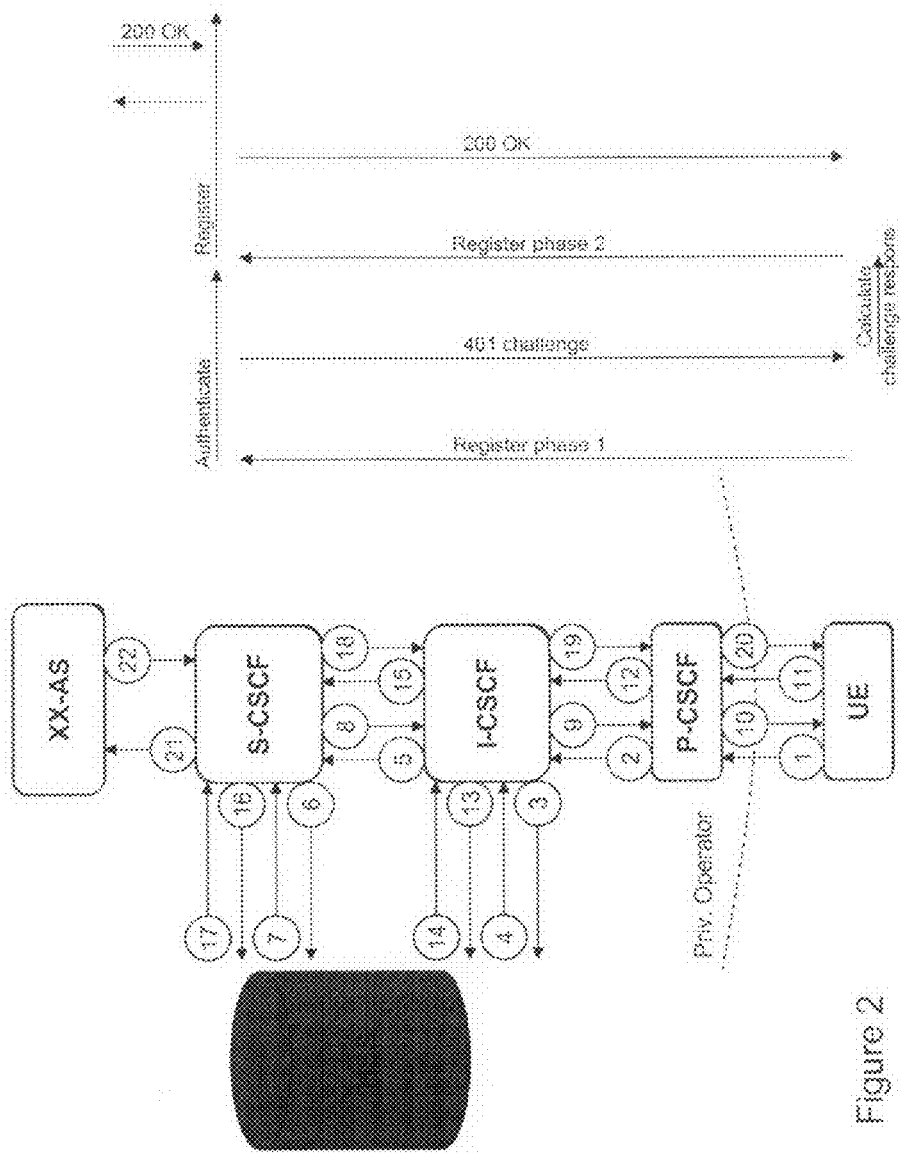
FIG. 2 illustrates schematically the standard registration procedure for an IMS according to the prior art.

In Fig. 2, Sheet 2 of 11, delete "challenge respons" and insert -- challenge response --, therefor.

In Column 6, Line 10, delete "S-SCSF." and insert -- S-CSCF. --, therefor.

In Column 7, Line 47, delete "P-Preferred. Identity" and insert -- P-Preferred-Identity --, therefor.

In Column 9, Line 64, delete "then" and insert -- than --, therefor.

In Column 12, Line 36, delete "URI;" and insert -- URI, --, therefor.

In Column 12, Line 40, delete "URI;" and insert -- URI, --, therefor.

In Column 12, Line 44, delete "invention;" and insert -- invention, --, therefor.

In Column 12, Line 48, delete "invention;" and insert -- invention. --, therefor.

In Column 13, Line 15, delete "then" and insert -- than --, therefor.

Signed and Sealed this
Twenty-seventh Day of November, 2012

David J. Kappos
*Director of the United States Patent and Trademark Office*

CERTIFICATE OF CORRECTION (continued)
U.S. Pat. No. 8,260,957 B2

In Column 15, Line 28, delete "enterprise1)" and insert -- enterprise1 --, therefor.

In Column 16, Line 26, delete "enterprise1)" and insert -- enterprise1 --, therefor.

In Column 17, Line 20, delete "enterprise1)" and insert -- enterprise1 --, therefor.

In Column 19, Line 2, delete "in" and insert -- is --, therefor.

In Column 19, Line 46, delete "then" and insert -- than --, therefor.

In Column 19, Line 67, delete "'!#'" and insert -- '!#!' --, therefor.